United States Patent
Zielinsky

(10) Patent No.: US 8,075,038 B2
(45) Date of Patent: Dec. 13, 2011

(54) MULTI-POSITION TAILGATE SUPPORT APPARATUS AND METHOD

(76) Inventor: Cary Russell Zielinsky, Liberty, UT (US)

( * ) Notice: Subject to any disclaimer, the term of this patent is extended or adjusted under 35 U.S.C. 154(b) by 123 days.

(21) Appl. No.: 12/637,537

(22) Filed: Dec. 14, 2009

(65) Prior Publication Data

US 2011/0121602 A1    May 26, 2011

Related U.S. Application Data

(63) Continuation-in-part of application No. 12/626,647, filed on Nov. 26, 2009.

(51) Int. Cl.
*E05C 17/30* (2006.01)
*E05C 17/36* (2006.01)
*B60J 5/10* (2006.01)

(52) U.S. Cl. .............. 296/57.1; 296/106; 16/82

(58) Field of Classification Search .......... 296/50, 296/57.1, 59, 146.8, 180.5, 106; 16/82; 24/298, 24/302
See application file for complete search history.

(56) References Cited

U.S. PATENT DOCUMENTS

| | | | | |
|---|---|---|---|---|
| 437,415 A * | 9/1890 | Bartlett | ........................ | 296/57.1 |
| 622,049 A * | 3/1899 | Kissinger | ...................... | 296/57.1 |
| 770,572 A * | 9/1904 | Gnatzig | ........................ | 296/57.1 |
| 1,125,982 A * | 1/1915 | Dufala | ........................ | 296/57.1 |
| 1,270,695 A * | 6/1918 | Carlson | ........................ | 296/57.1 |
| 2,364,648 A * | 12/1944 | Olson | ........................ | 296/57.1 |
| 2,388,075 A * | 10/1945 | Peters | ........................ | 292/267 |
| 2,561,081 A * | 7/1951 | Vars | ........................ | 292/268 |
| 3,023,042 A * | 2/1962 | Hill | ........................ | 292/276 |
| 3,398,985 A * | 8/1968 | Rhoades | ........................ | 296/57.1 |
| 6,048,018 A * | 4/2000 | Shambeau et al. | ........... | 296/57.1 |
| 6,267,429 B1 * | 7/2001 | Kuzmich et al. | ................ | 296/50 |
| 6,279,979 B1 * | 8/2001 | Cauley | ........................ | 296/57.1 |
| 6,450,559 B1 * | 9/2002 | Renke | ........................ | 296/57.1 |
| 6,857,678 B2 * | 2/2005 | Lisk, III | ........................ | 296/50 |

* cited by examiner

*Primary Examiner* — Glenn Dayoan
*Assistant Examiner* — Gregory Blankenship
(74) *Attorney, Agent, or Firm* — Warren M. Pate, LLC

(57) ABSTRACT

A method and apparatus for adjusting the location of suspension for a tailgate is disclosed. The method may include selecting a vehicle comprising a first side, a second side, a tailgate, and at least one tailgate support. The tailgate may be connected to pivot with respect to the first and second sides through a range of motion. The at least one tailgate support may have a first end connected to the first side, a second end connected to tailgate, and an adjustor positioned between the first and second ends. The method may further include actuating or manipulating the adjustor to change the length under tension of at least one tailgate support. By changing this length, the location of suspension for the tailgate may be adjusted.

20 Claims, 22 Drawing Sheets

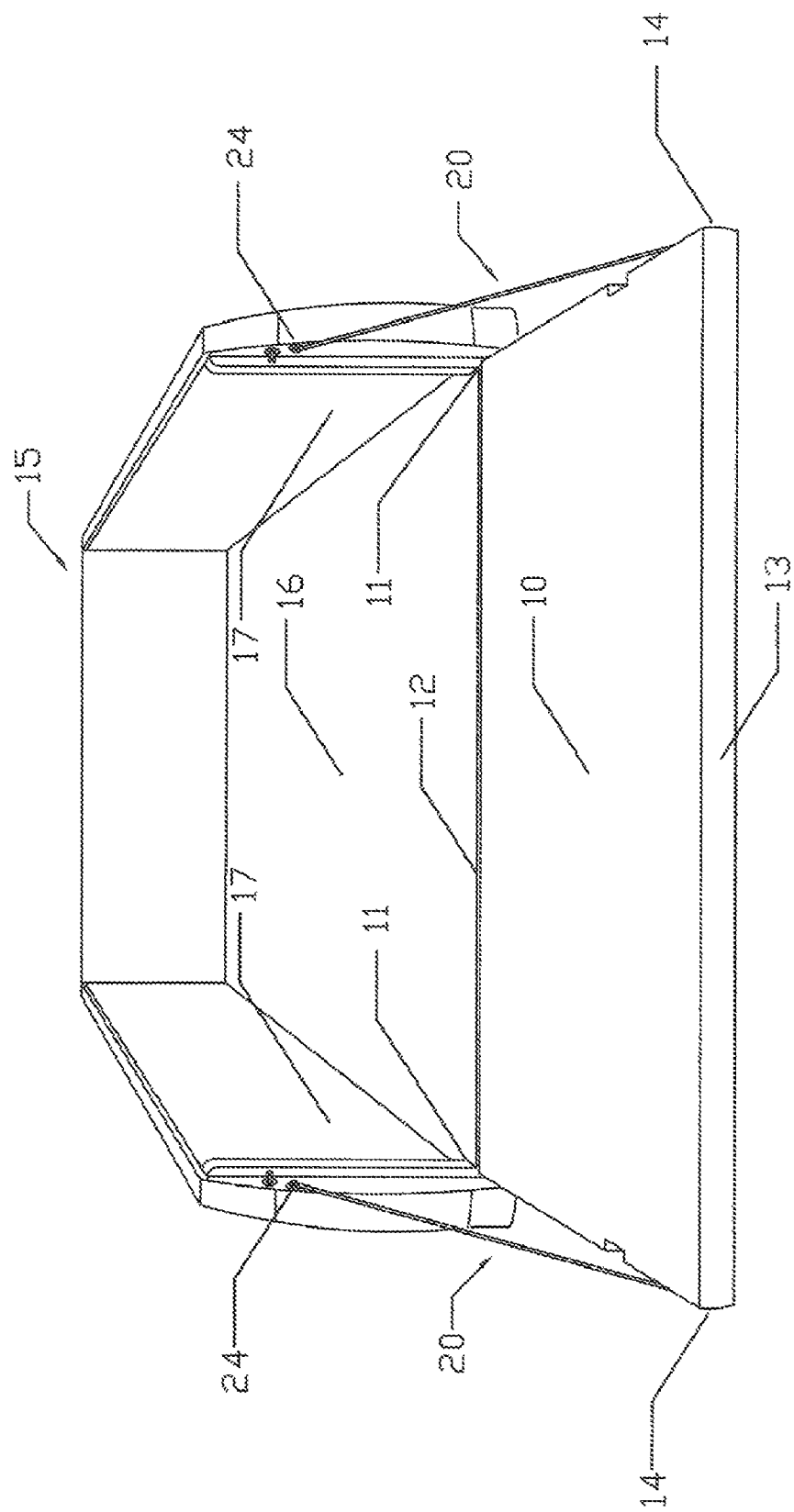

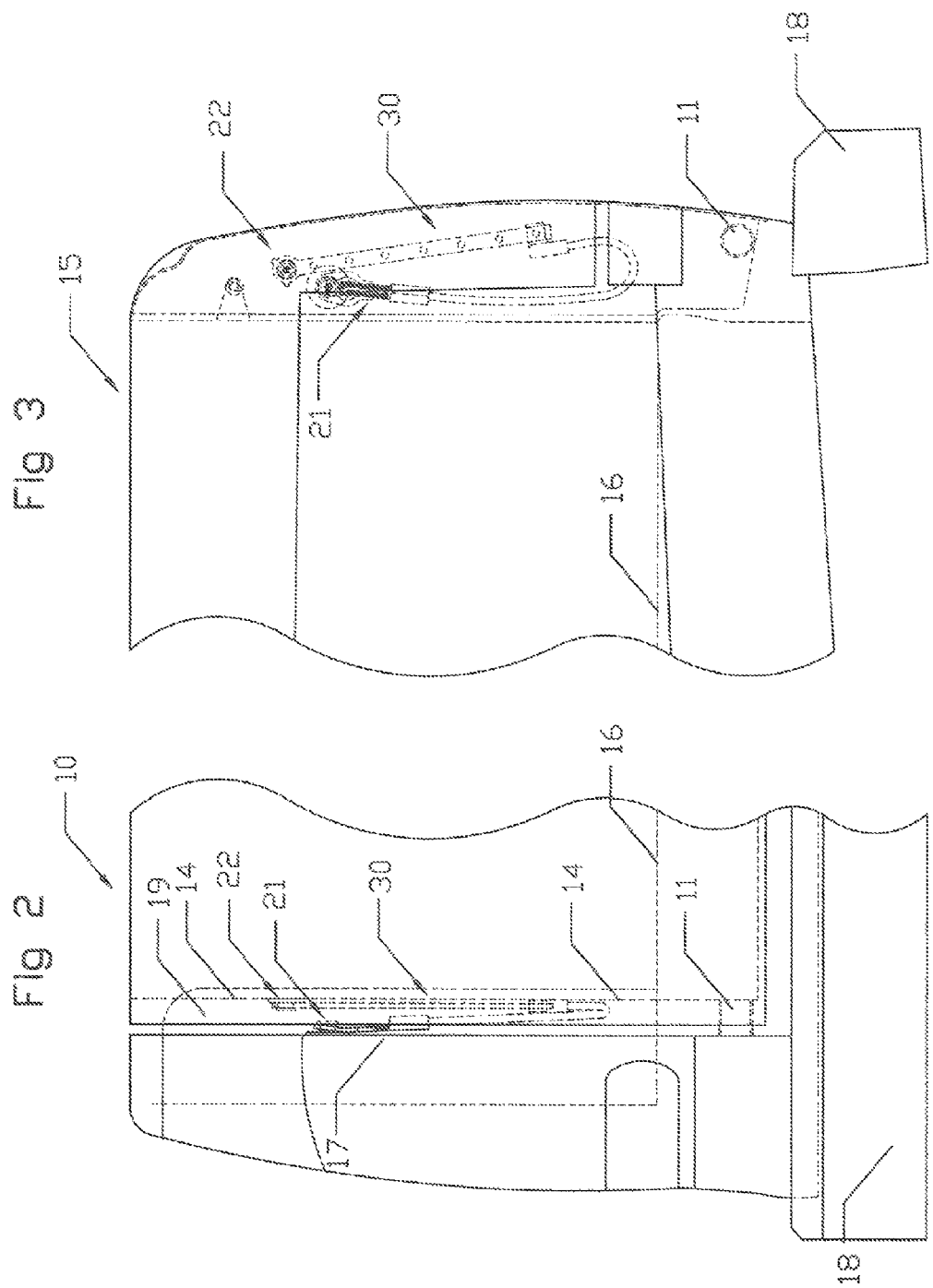

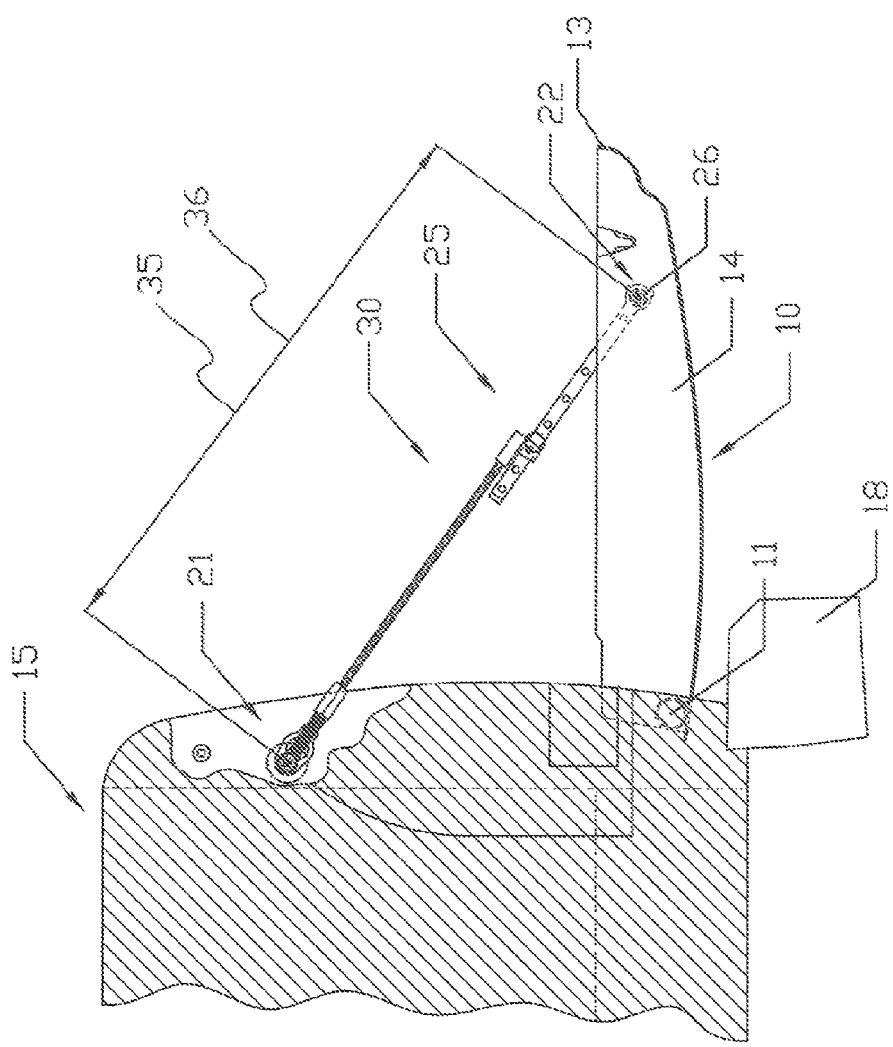

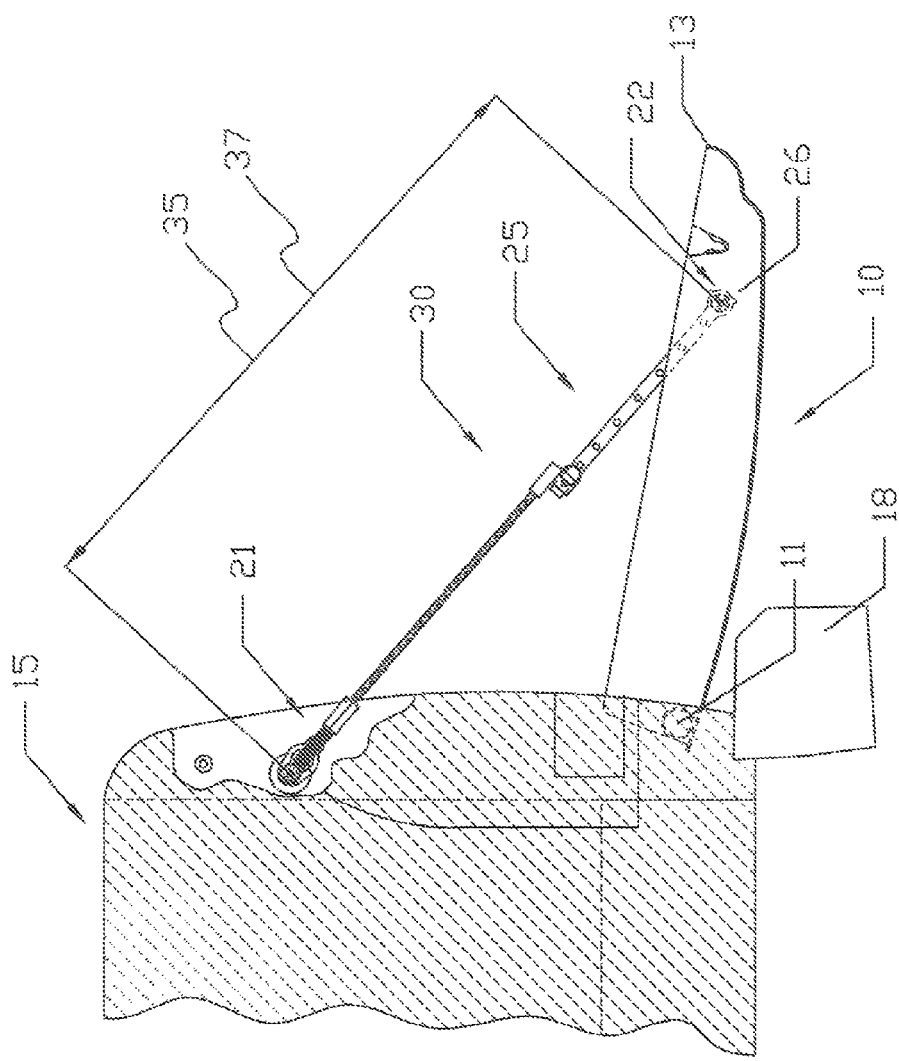

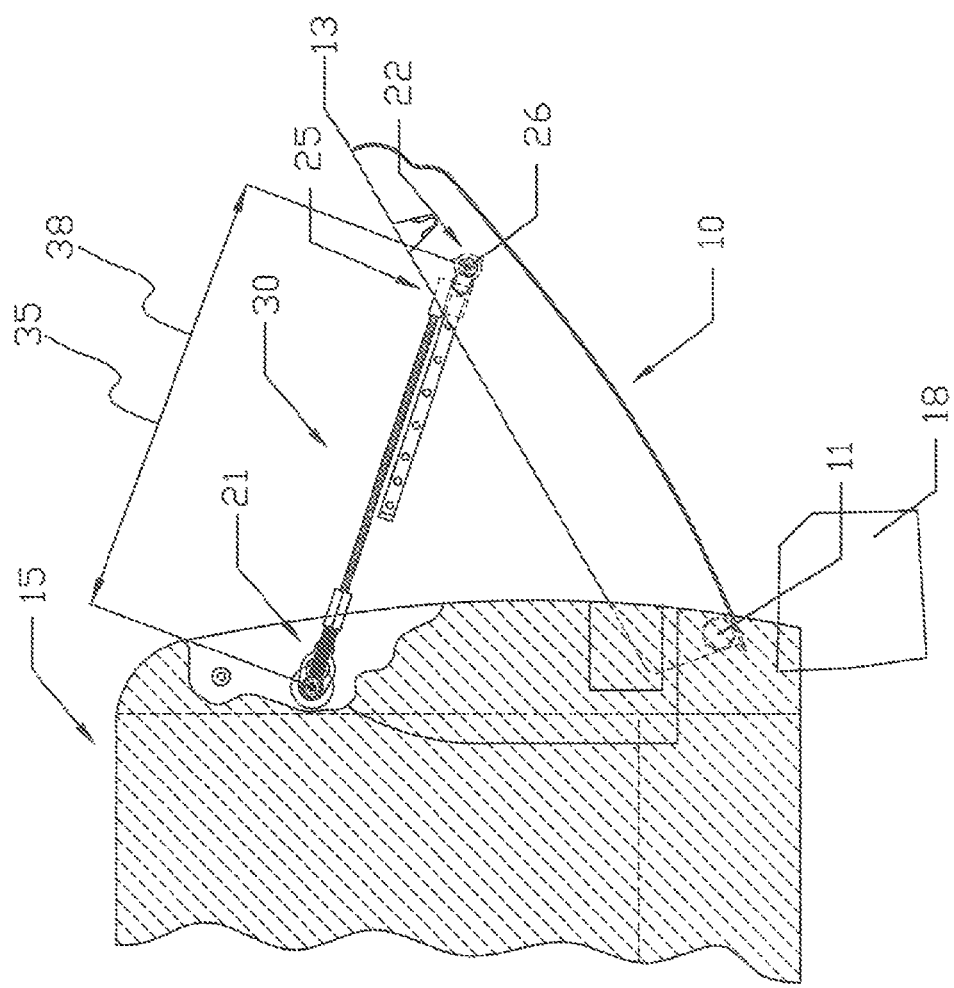

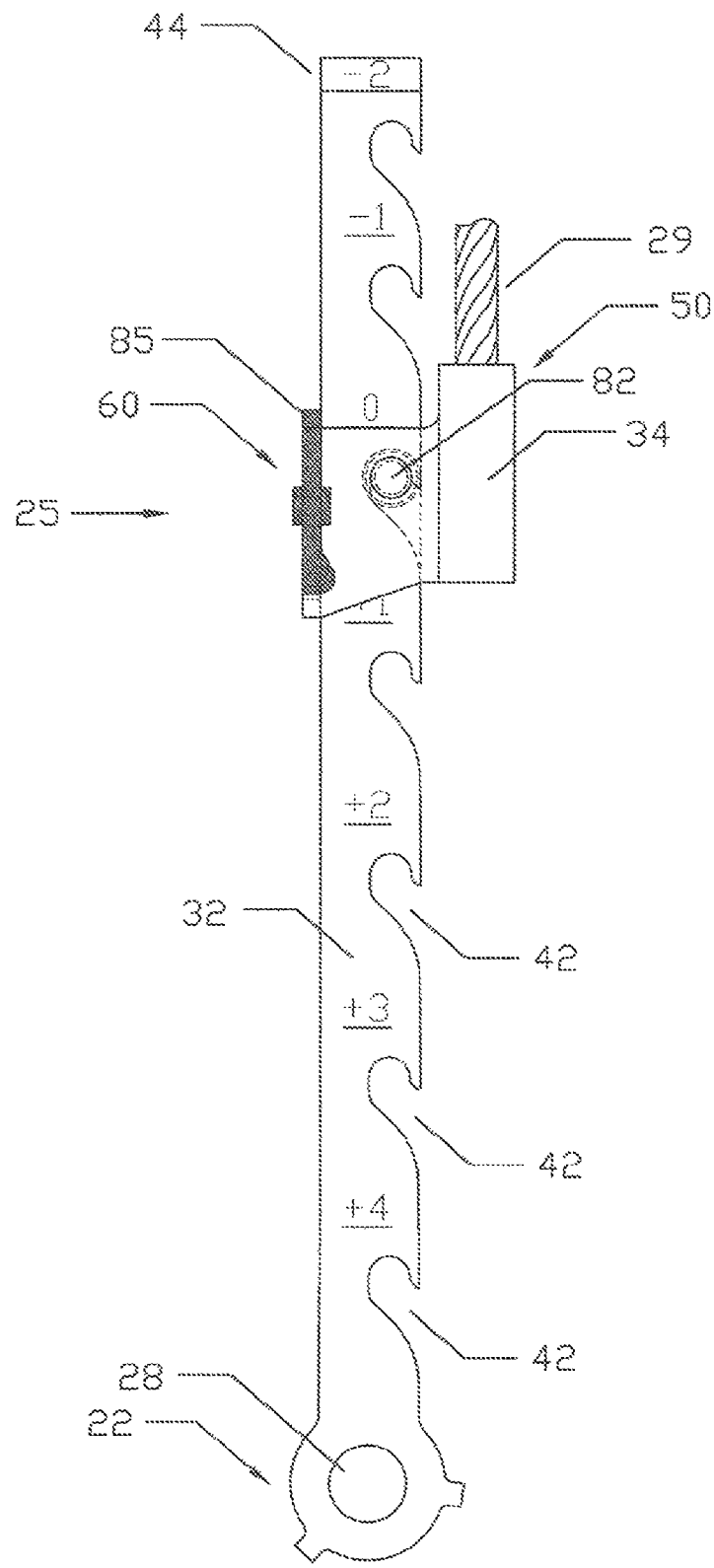

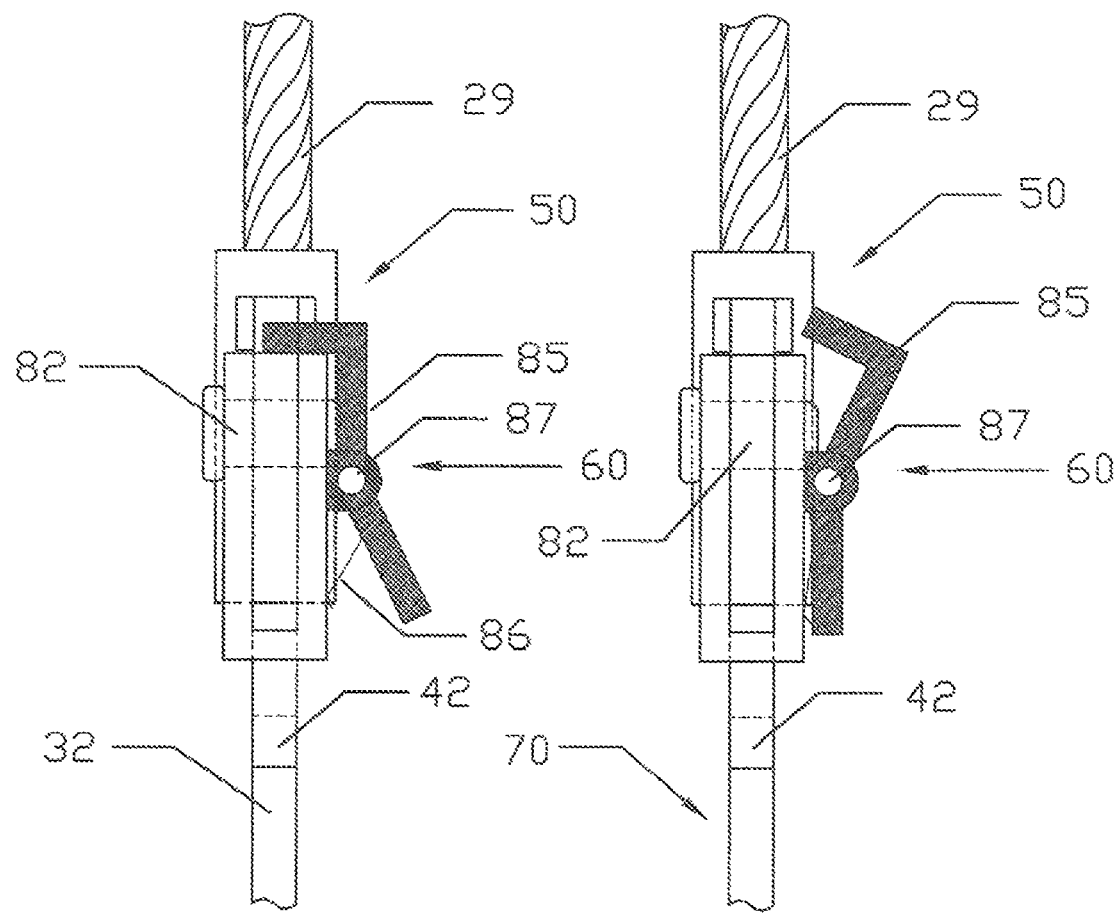

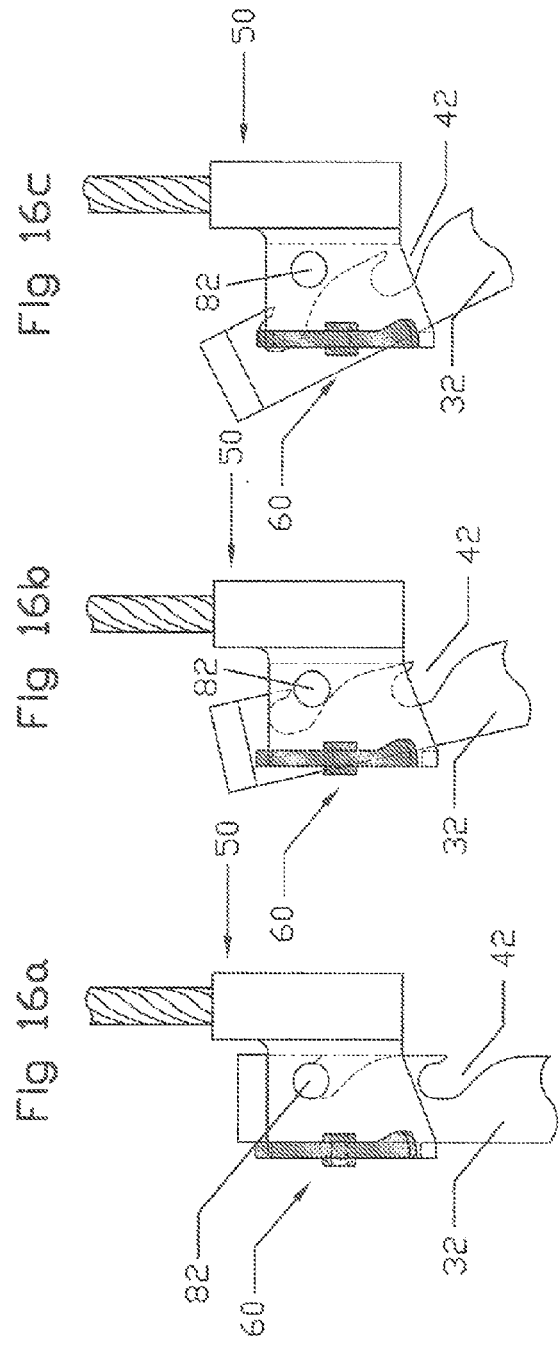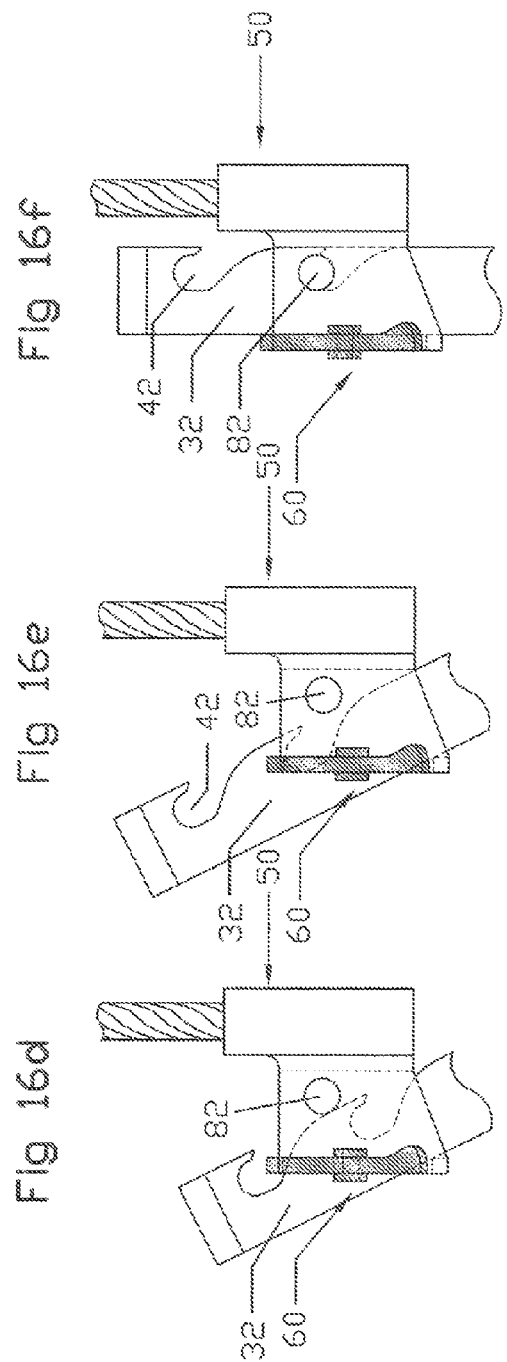

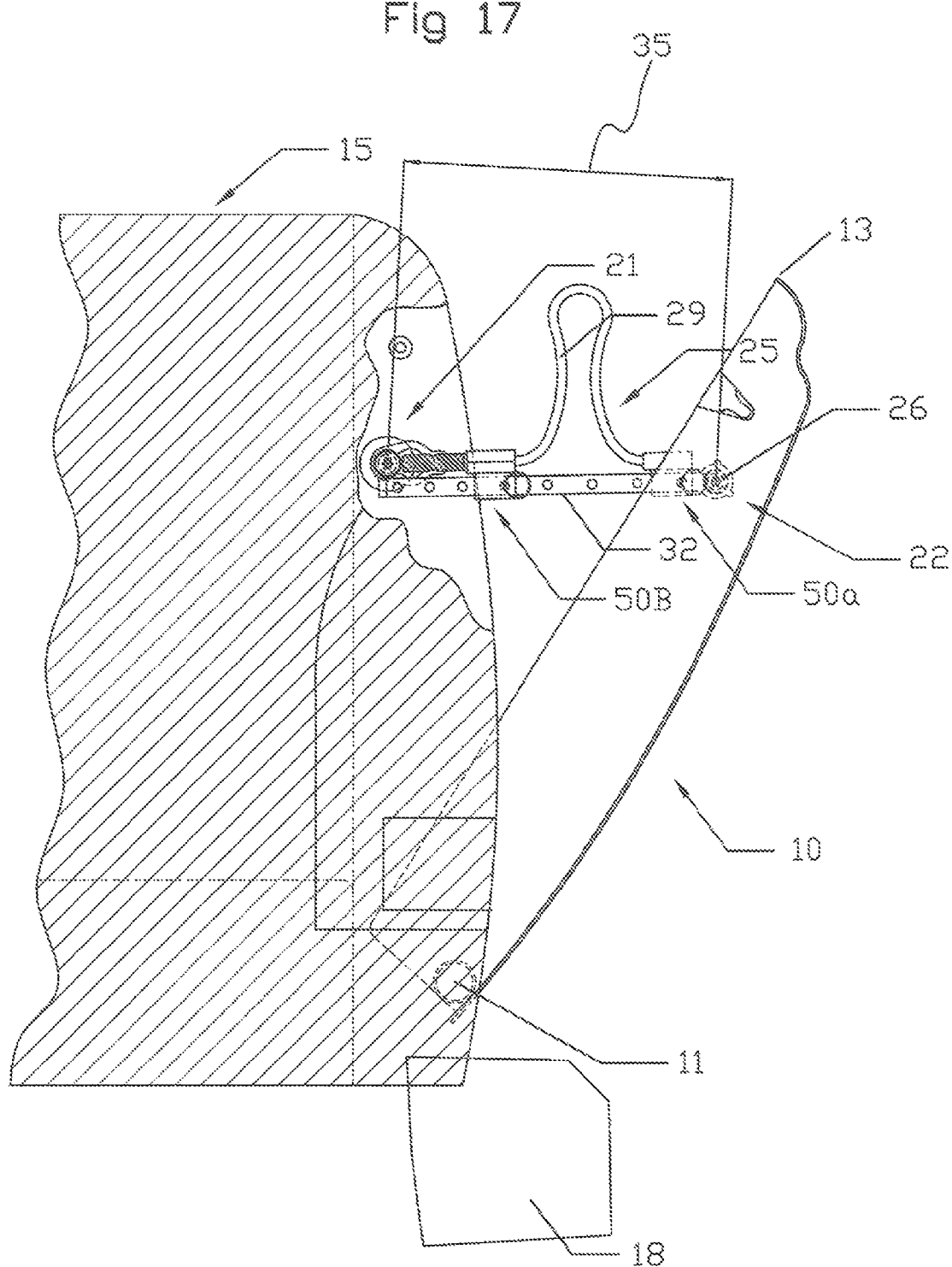

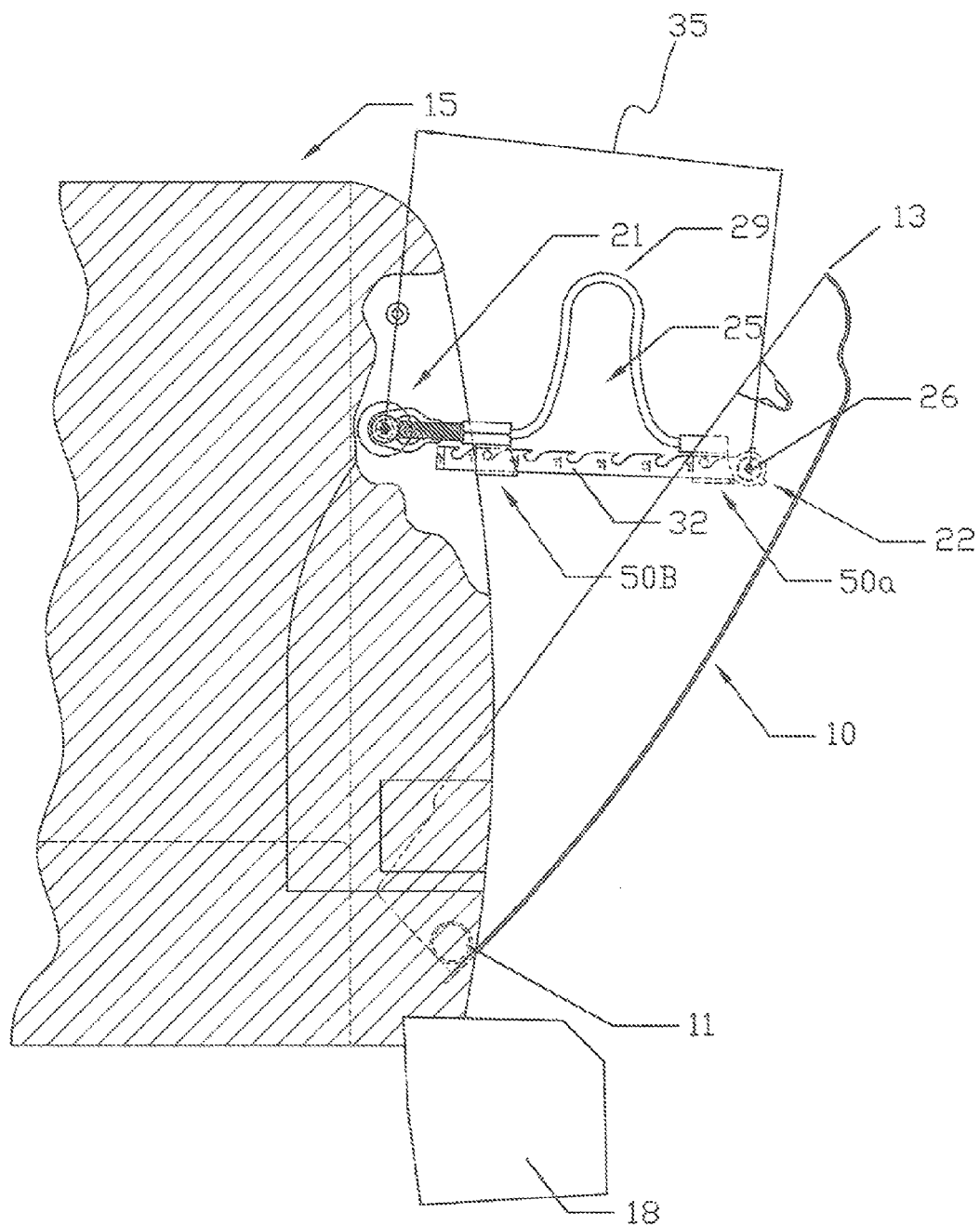

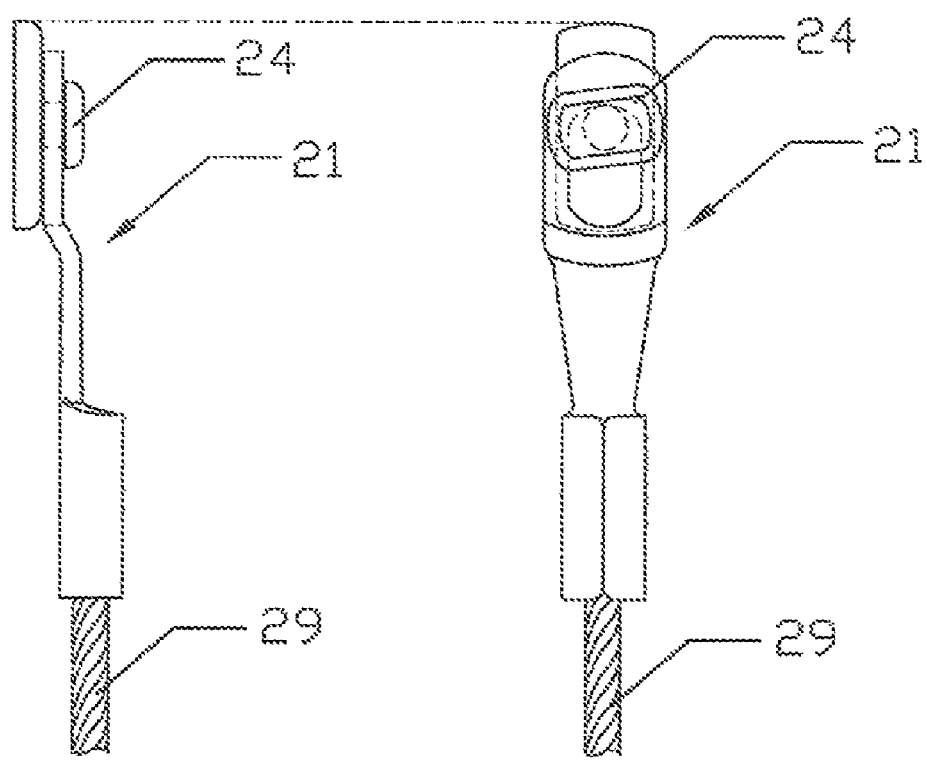

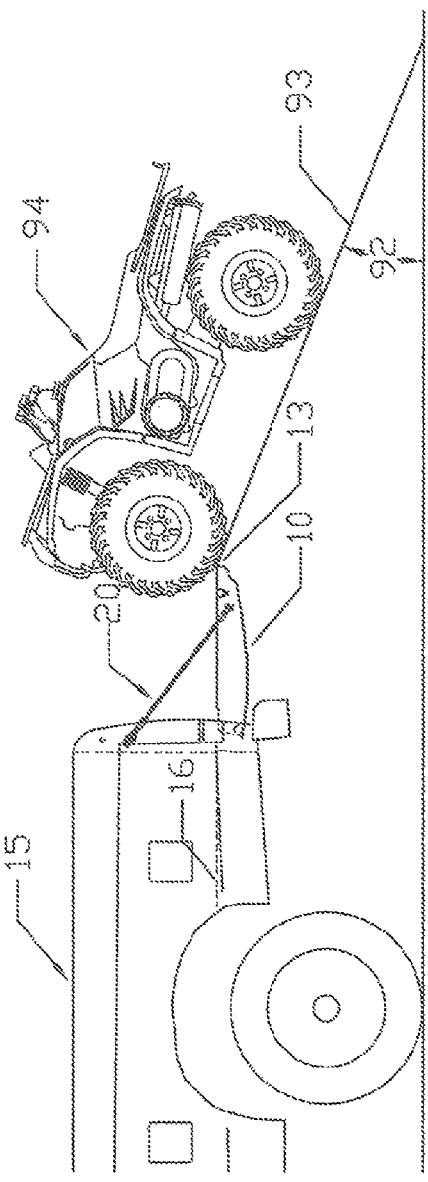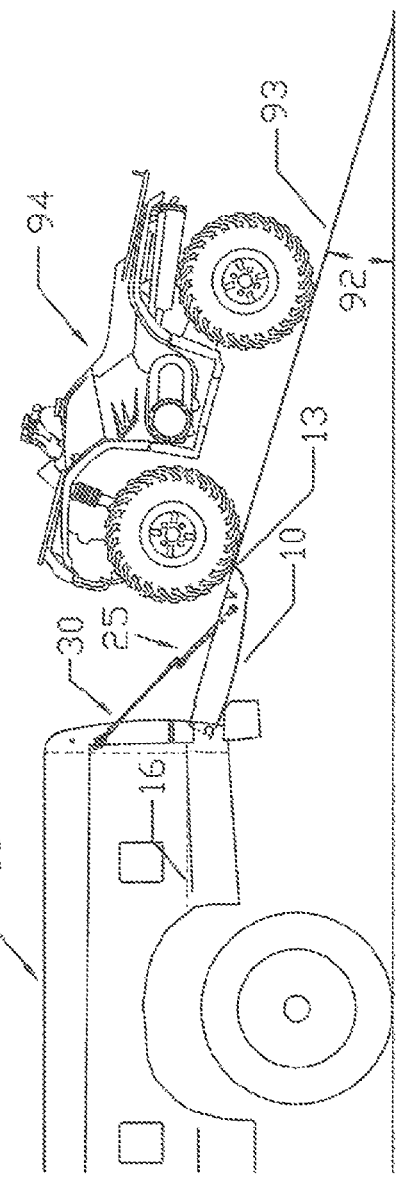

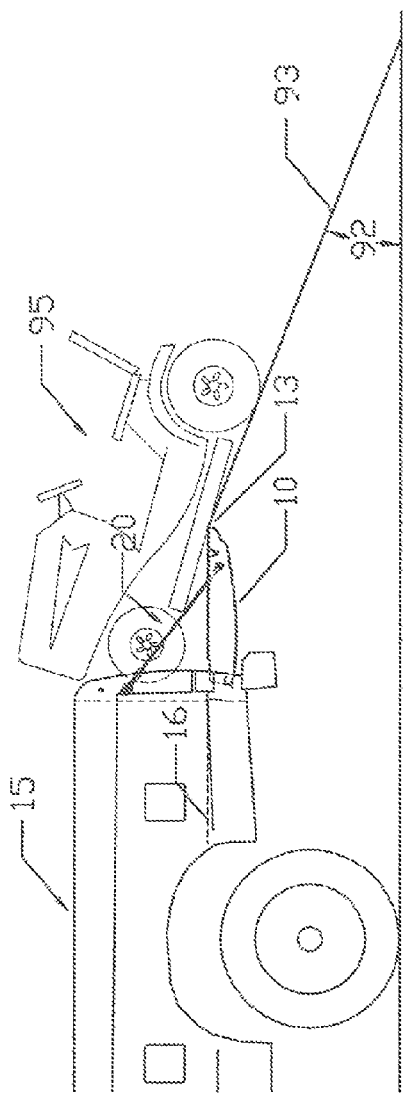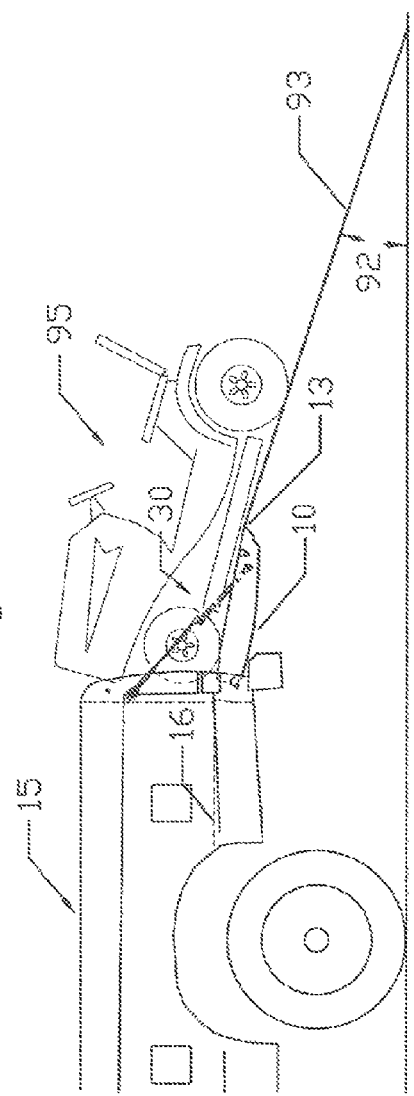

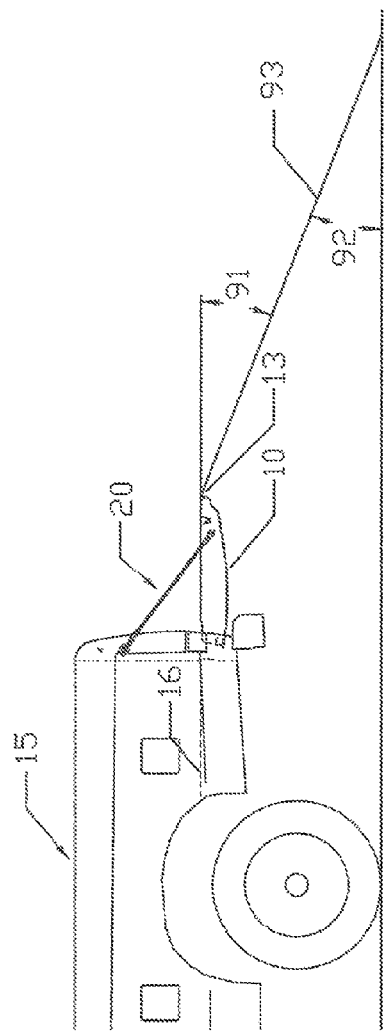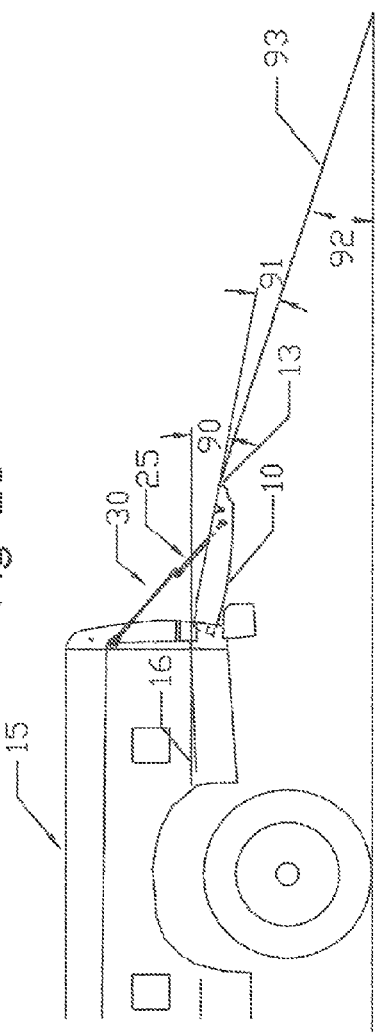

MULTI-POSITION TAILGATE SUPPORT APPARATUS AND METHOD

RELATED APPLICATIONS

This application is a continuation-in-part of co-pending U.S. patent application Ser. No. 12/626,647 filed Nov. 26, 2009, which is hereby incorporated by reference.

BACKGROUND

1. Field of Invention

This invention relates to motor vehicles and utility trailers and, more particularly, to apparatus and methods for a multi-position tailgate support facilitating suspension of a tailgate in multiple positions that each retain the tailgate's external appearance and full load-carrying capacity.

2. Prior Art

In certain situations, it may be desirable to have a low loading height on a vehicle. In the past, attempts to lower vehicle loading height have focused in two primary areas. First, attempts have been made to lower the bed height of certain vehicles. While this may work well for trailers and special purpose vehicles, it is problematic for multi-use vehicles like pickup trucks, which have certain structural limitations and clearance requirements. Second, attempts have been made to add hoists to vehicles. While hoists neutralize the need for a lower loading height by simply lifting the load for the user, they are typically large, heavy, and expensive. Thus, neither of these two areas of improvement is particularly helpful for the average pickup truck user.

Currently, many vehicles, including pickup trucks, have tailgates. However, a typical tailgate is of no assistance in raising or lowering vehicle loading height. Conventional tailgates pivot between a closed position and an open position. The open position is typically ninety degrees of rotation from the closed position. Accordingly, a typical tailgate in the open position forms an extension to the bed of the vehicle. Thus, the loading height of a vehicle with a tailgate is typically the height of the bed. In view of the foregoing, what is needed is an inexpensive and unobtrusive apparatus and method for either raising or lowering the loading height of a vehicle like a common, everyday, pickup truck. Additionally, what is needed is a tailgate that retains its full load-bearing capacity in a partially open position, which position may provide increased retention of loads extending longer than the cargo area of the pickup truck.

SUMMARY

The present invention relates in selected embodiments to vehicles with tailgates such as, without limitation, pick-up trucks having tailgates that rotate about a horizontal pivot axis positioned proximate a lower edge of the tailgate. Certain devices in accordance with the present invention may provide an easy to install and use quick change, multi-position tailgate support. When installed, a tailgate support in accordance with the present invention may allow the tailgate to be used (e.g., loaded with weight) in multiple positions. For example, in one embodiment, the tailgate may be used in a conventional open position, one or more open positions above the conventional open position, and one or more positions below the conventional open position.

In selected embodiments, tailgate supports in accordance with the present invention may allow tailgates suspended therefrom to be moved from one position to the other by simply disengaging a lock, sliding a traveler along or over an extension to a new location, and engaging the lock to fix the traveler with respect to the extension in the new location. Accordingly, the location at which a tailgate is suspended may be changed without changing the external appearance or the full load-carrying capacity of the tailgate.

In certain embodiments, a tailgate support may include a first end, a second end positioned opposite the first end, and an adjustor positioned between the first and second ends. A first end of a tailgate support may comprise a quick detach fitting configured to engage a stud extending from the vehicle (e.g., from the side wall of a truck bed). A second end of a tailgate support may comprise an aperture facilitating securement (e.g., bolting) of the second end to a tailgate.

An adjustor in accordance with the present invention may comprise an extension, traveler, and lock. A lock may be configured to selectively fix a traveler to an extension at multiple locations along the extension. In one embodiment, an extension may include an array of apertures, a traveler may include a locking aperture, and a lock may comprise a locking pin. When the locking aperture of a traveler is aligned with an aperture of the extension, the apertures may collectively form a composite aperture. The locking pin may be inserted within this composite aperture and effectively lock or fix the traveler with respect to the extension.

Tailgate supports may provide the variability described hereinabove, while retaining the appearance and other functionality (e.g., opening, closing, locking, etc.) of the tailgate. In selected embodiments, installation of a tailgate support may not require permanent modification of the vehicle. The changes made when installing a tailgate support may be completely and easily reversible. Accordingly, a tailgate support in accordance with the present invention may be well suited as either an O.E.M option or an aftermarket accessory.

By supporting or suspending a tailgate in an open position that is more than ninety degrees from the closed position, a tailgate support may lower the loading height of the corresponding vehicle. A lower loading height may reduce the incline angle of loading ramps commonly used to load items such as motorcycles, ATVs, small tractors, and the like. Reducing the incline of such ramps may make it easier and safer to load and unload such items. Additionally, a tailgate with a lower leading edge may support loading of items with low ground clearance (e.g., riding lawn mowers), which would normally hang on the leading edge of a conventional tailgate at the location where the ramps rest.

By supporting or suspending a tailgate in an open position that is less than ninety degrees from the closed position, a tailgate support may resist rearward movement of cargo that is longer than the cargo area of the corresponding vehicle. Additionally, a tailgate with a higher leading edge may facilitate transfer of items between a cargo area and surfaces higher than the cargo area (e.g., loading docks).

Selected embodiments in accordance with the present invention may comprise systems or packages including a new bumper or bumper relocation kit. These new bumpers or bumper relocation kits may accommodate a lower tailgate position than conventional bumpers. Such bumpers and bumper relocation kits may support greater lowering by a tailgate support in accordance with the present invention.

Additionally, tailgate supports in accordance with the present invention may be packaged or combined with paint protection padding or barrier material. This padding or barrier material may be applied to the tailgate, bed side surfaces of a vehicle, or combinations thereof that are adjacent a tailgate support when the tailgate is in the closed position. This padding or barrier material may reduce or eliminate any adverse effects or wear caused by tailgate supports in accordance with the present invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a perspective view of one embodiment of a truck bed with a tailgate in a conventional open position;

FIG. 2 is a partial rear elevation view of a pickup truck having a tailgate in the closed position illustrating how a tailgate support in accordance with the present invention fits within the void between the side edge of the tailgate and the side wall of the truck bed;

FIG. 3 is a partial side elevation view of a pickup truck having a tailgate in the closed position illustrating how a tailgate support in accordance with the present invention fits within the void between the side edge of the tailgate and the side wall of the truck bed;

FIG. 4 is a side elevation view of one embodiment of a tailgate support in accordance with the present invention suspending a tailgate in the conventional open position;

FIG. 5 is a side elevation view of the tailgate support of FIG. 4 suspending a tailgate below the conventional open position;

FIG. 6 is a side elevation view of the tailgate support of FIG. 4 suspending a tailgate above the conventional open position;

FIG. 12 is a side elevation view of the adjustor of the tailgate support of FIG. 10;

FIG. 13 is a front elevation view of the traveler and lock of the tailgate support of FIG. 10 with the lock in an engaged position;

FIG. 14 is a front elevation view of the traveler and lock of the tailgate support of FIG. 10 with the lock in a disengaged position;

FIG. 16a through 16f show various partial side elevation views of the adjustor of the tailgate support of FIG. 10 with the tailgate support progressing from one tensioned length to a shorter tensioned length;

FIG. 17 is a side elevation view of an alternative embodiment of a tailgate support having multiple travelers and suspending a tailgate well above the conventional open position in accordance with the present invention;

FIG. 18 is a side elevation view of another alternative embodiment of a tailgate support having multiple travelers and suspending a tailgate well above the conventional open position in accordance with the present invention;

FIG. 19 provides side elevation and front elevation views of an alternative embodiment of a first end of a tailgate support engaging a stud in accordance with the present invention;

FIG. 20 is a schematic diagram illustrating the loading of an ATV onto a tailgate suspended in a conventional open position;

FIG. 21 is a schematic diagram illustrating the loading of an ATV onto a tailgate suspended, by a tailgate support in accordance with the present invention, below a conventional open position;

FIG. 22 is a schematic diagram illustrating the loading of a riding lawn mower onto a tailgate suspended in a conventional open position;

FIG. 23 is a schematic diagram illustrating the loading of a riding lawn mower onto a tailgate suspended, by a tailgate support in accordance with the present invention, below a conventional open position;

FIG. 24 is a schematic diagram illustrating the break-over angle of a tailgate suspended in a conventional open position;

FIG. 25 is a schematic diagram illustrating the break-over angle of a tailgate suspended, by a tailgate support in accordance with the present invention, below a conventional open position;

KEY FOR REFERENCE NUMERALS CONTAINED IN DRAWINGS

Figure 7:
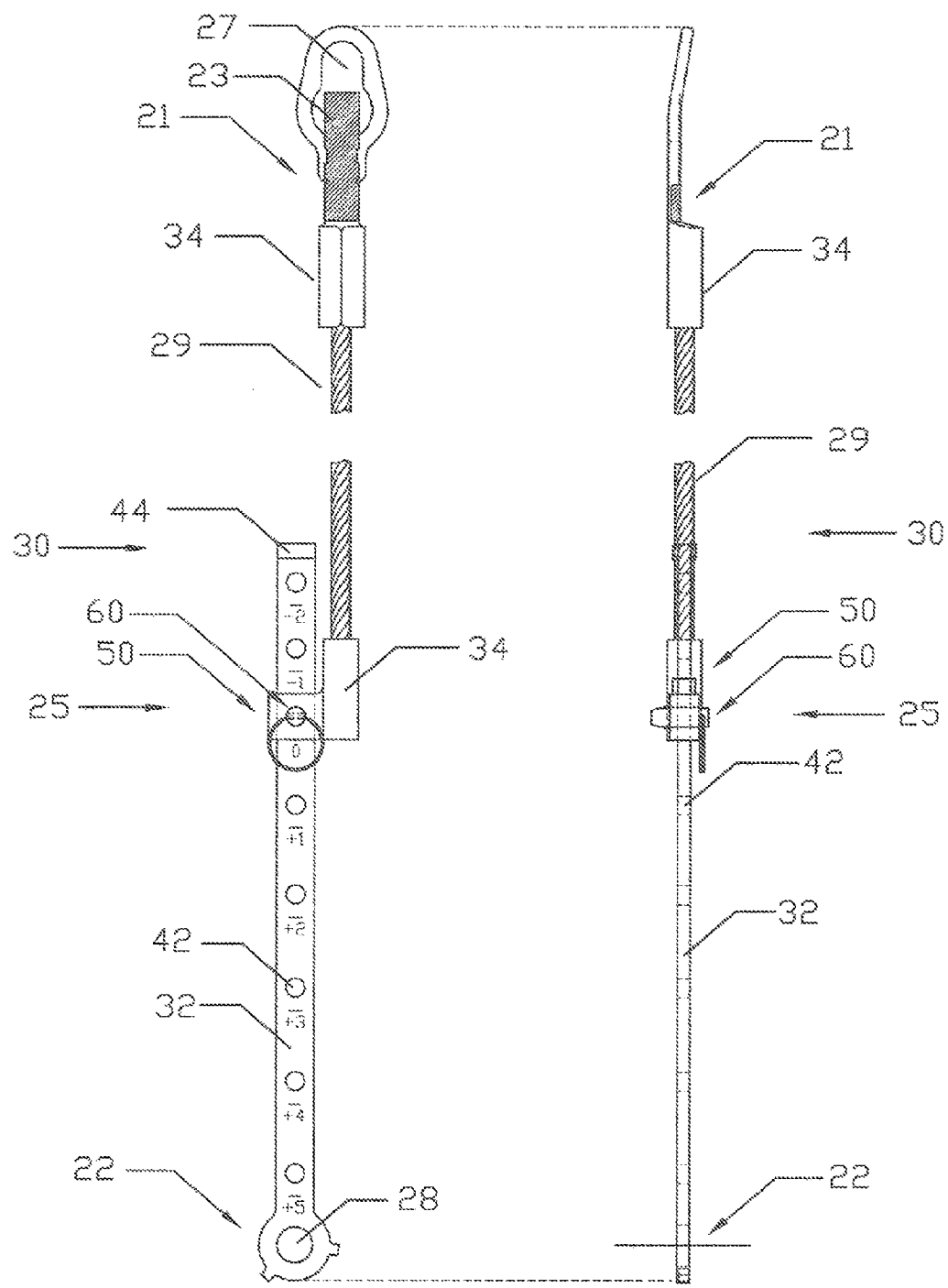
FIG. 7 provides partial side elevation and front elevation views of the tailgate support of FIG. 4.

10—tailgate
11—tailgate hinge pivot
12—pivot edge
13—leading edge or top edge
14—tailgate side
15—cargo area or truck bed
16—bed floor
17—bed side or side wall
18—bumper
19—void between bed side and tailgate edge when tailgate is closed
20—tailgate cable or linkage
21—first or detachable end
22—second or fixed end
23—keeper
24—tailgate support stud
25—adjustor
26—fastener
27—aperture in first end of tailgate support 28—aperture in second end of tailgate support
29—cable
30—tailgate support
32—extension
34—receiver
35—tensioned length
36—first value of tensioned length
37—second value of tensioned length
38—third value of tensioned length
42—apertures in extension
44—stop on one end of extension
50—traveler
50a—first traveler
50b—second traveler
54—locking aperture in traveler
56—aperture in traveler for receiving extension
60—lock
62—locking pin
64—ring
66—detent
68—lanyard
82—pin in alternative embodiment of traveler
84—aperture for receiving pin in alternative embodiment of traveler
85—latch
86—spring
87—pivot
90—tailgate decline angle
91—break over angle
92—loading ramp angle
93—loading ramp
94—All Terrain Vehicle (ATV)
95—riding lawn mower
96—cargo
97—motorcycle
98—loading dock

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, in selected embodiments, a cargo area 15 or bed 15 of a vehicle such as a pickup truck may include a tailgate 10, two bed sides 17 or side walls 17, two tailgate cables 20 or linkages 20, and a bed floor 16. A tailgate 10 may be pivotable about a tailgate pivot 11 and have a pivot edge 12 and a leading or top edge 13. The tailgate 10 may be supported or suspended in the open position by the tailgate cables 20 or linkages 20. One end of each tailgate cable 20 or linkage 20 may be attach to a stud 24 located on the side walls 17 or bed sides 17 of the cargo area 15. The other end of each tailgate cable 20 or linkage 20 may attach to a tailgate side 14. The tailgate 10 may be pivotable about a tailgate pivot 11 between a generally vertical closed or first position and an open or second position.

Referring to FIGS. 2 through 6, a tailgate support 30 in accordance with the present invention may be installed in the place of a tailgate cable 20 or tailgate linkage 20. This may be done as an "aftermarket" modification. For example, after purchasing a pickup truck, an owner may purchase two tailgate supports 30. The owner may then remove the two tailgate cables 20 or linkages 20 from the pickup truck and install in the place thereof the two tailgate supports 30. Alternatively, one or more tailgate supports 30 may be installed on a vehicle in an initial manufacturing process.

A tailgate support 30 may include hardware facilitating installation thereof on existing, common, or conventional tailgate systems. For example, a first end 21 of a tailgate support 30 may be sized and shaped to engage and retain a stud 24 extending from the side wall 17 of a vehicle. A second end 22 of a tailgate support 30 may be attached the tailgate side 14 by a fastener (e.g., a bolt 26). In selected embodiments, a second end 22 may include an aperture for receiving the fastener 26 therethrough.

Between the first and second ends 21, 22, a tailgate support 30 may include an adjustor 25. By actuating or manipulating an adjustor 25, a user may change the tensioned length 35 (i.e., length when tensioned) of a tailgate support 30. The tensioned length 35 of a tailgate support 30 may be achieved by pulling the first and second ends 21, 22 away from one another. Actuating or manipulating an adjustor 25 may adjust the tensioned length 35 of a tailgate support 30 between various distinct values.

In the illustrated embodiment, one such value 36 may correspond to a tailgate 10 supported or suspended in a conventional open position, which is about ninety degrees of rotation from the closed position. Another such value 37 may correspond to a tailgate 10 supported or suspended with its leading or top edge 13 lower than it is in the convention open position. Yet another such value 38 may correspond to a tailgate 10 supported or suspended with its leading or top edge 13 higher than it is in the convention open position.

A tailgate support 30 in accordance with the present invention may be configured to minimize any undesirable wear on the vehicle of a user. For example, in certain embodiments, one or more surfaces of the tailgate support 30 may be coated with a rubber like material to protect the paint on a corresponding vehicle. Alternatively, tailgate supports 30 in accordance with the present invention may be packaged or combined with paint protection padding or barrier material. This padding or barrier material may be applied to the tailgate 10, bed side 17 surfaces of a vehicle, or combinations thereof that are adjacent a tailgate support 30 when the tailgate 10 is in the closed position. This padding or barrier material may reduce or eliminate any adverse effects or wear caused by tailgate supports 30.

Figure 8:
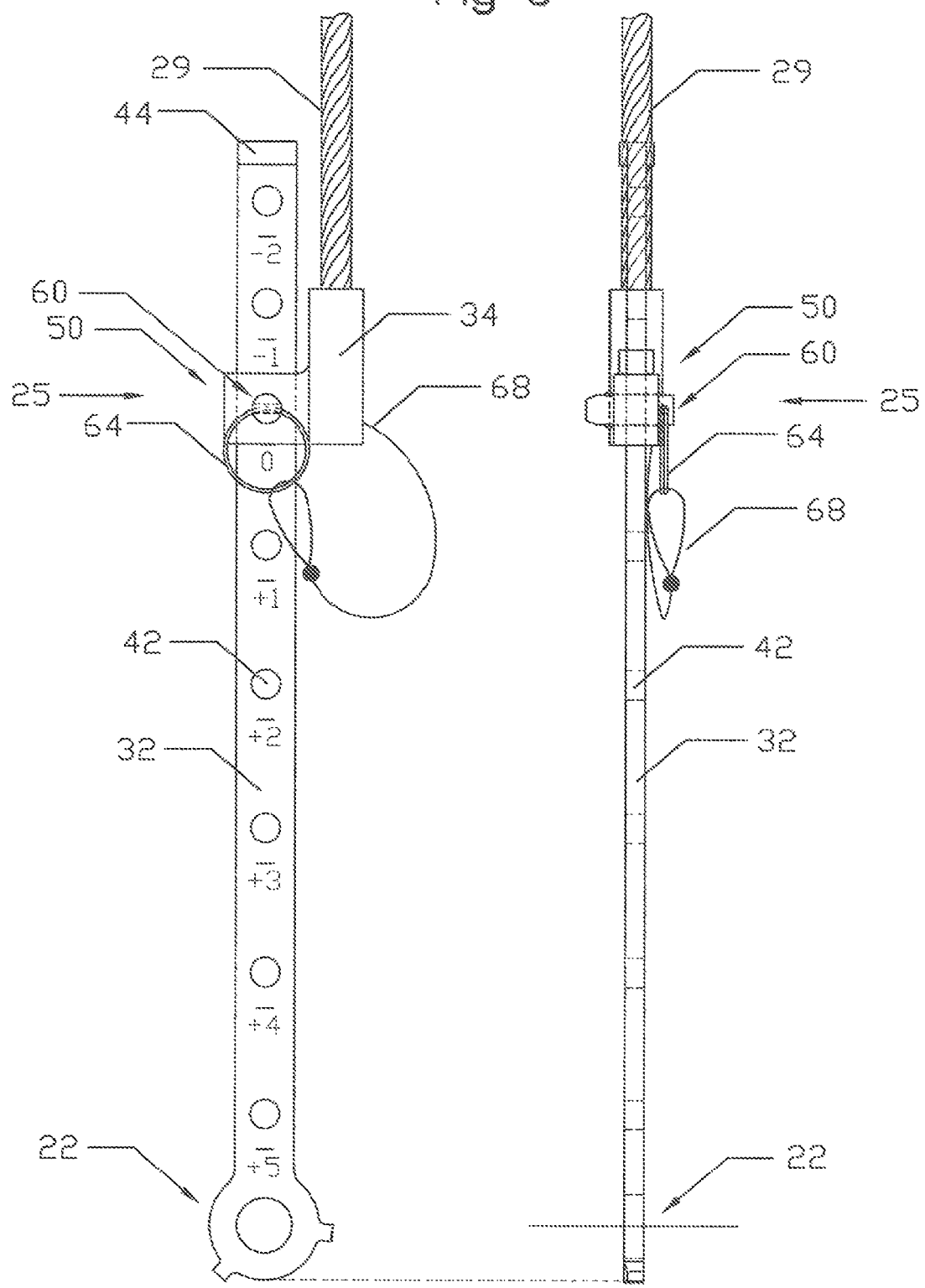
FIG. 8 provides partial side elevation and front elevation views of the tailgate support of FIG. 4 modified to include a lanyard connecting a locking pin to a traveler.
Figure 9:
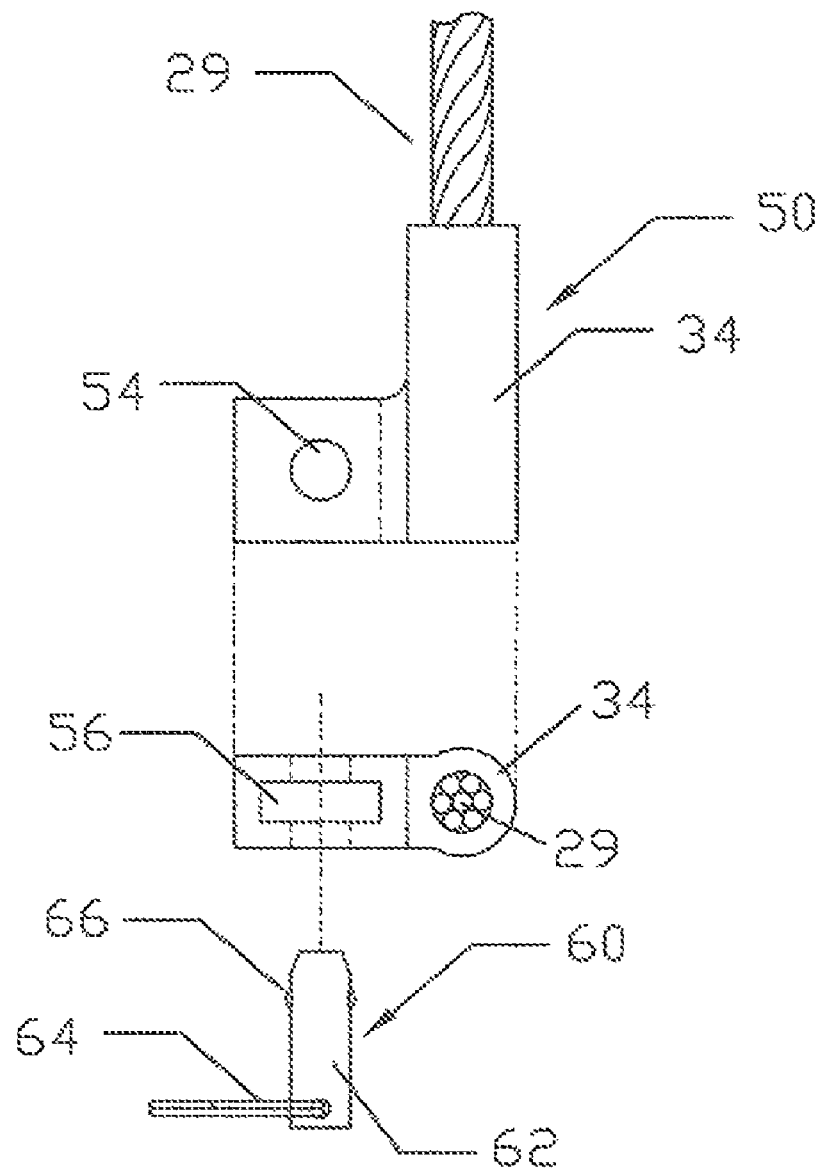
FIG. 9 provides side elevation and end views of the traveler of the tailgate support of FIG. 4 and a side elevation view of the lock of the tailgate support of FIG. 4.
Figure 10:
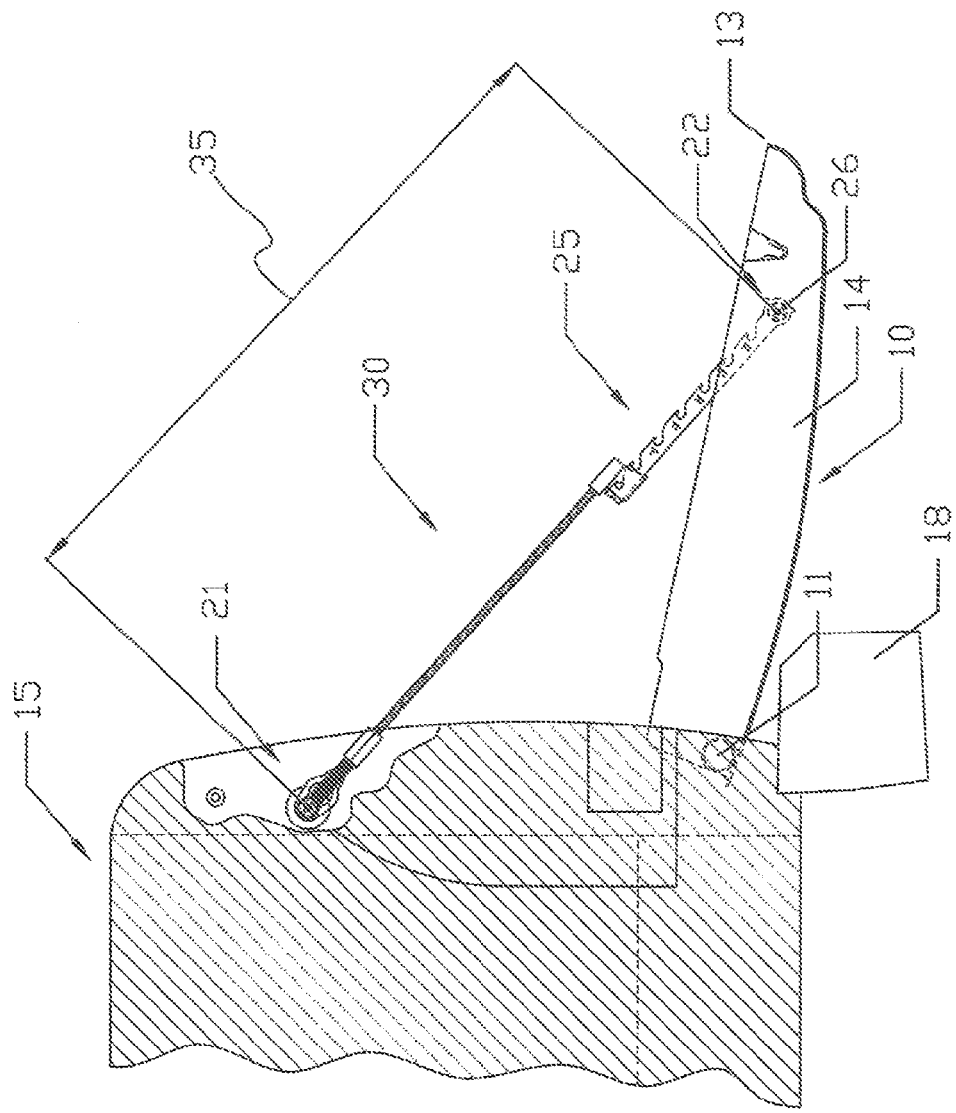
FIG. 10 is a side elevation view of an alternative embodiment of a tailgate support in accordance with the present invention suspending tailgate below the conventional open position.
Figure 11:
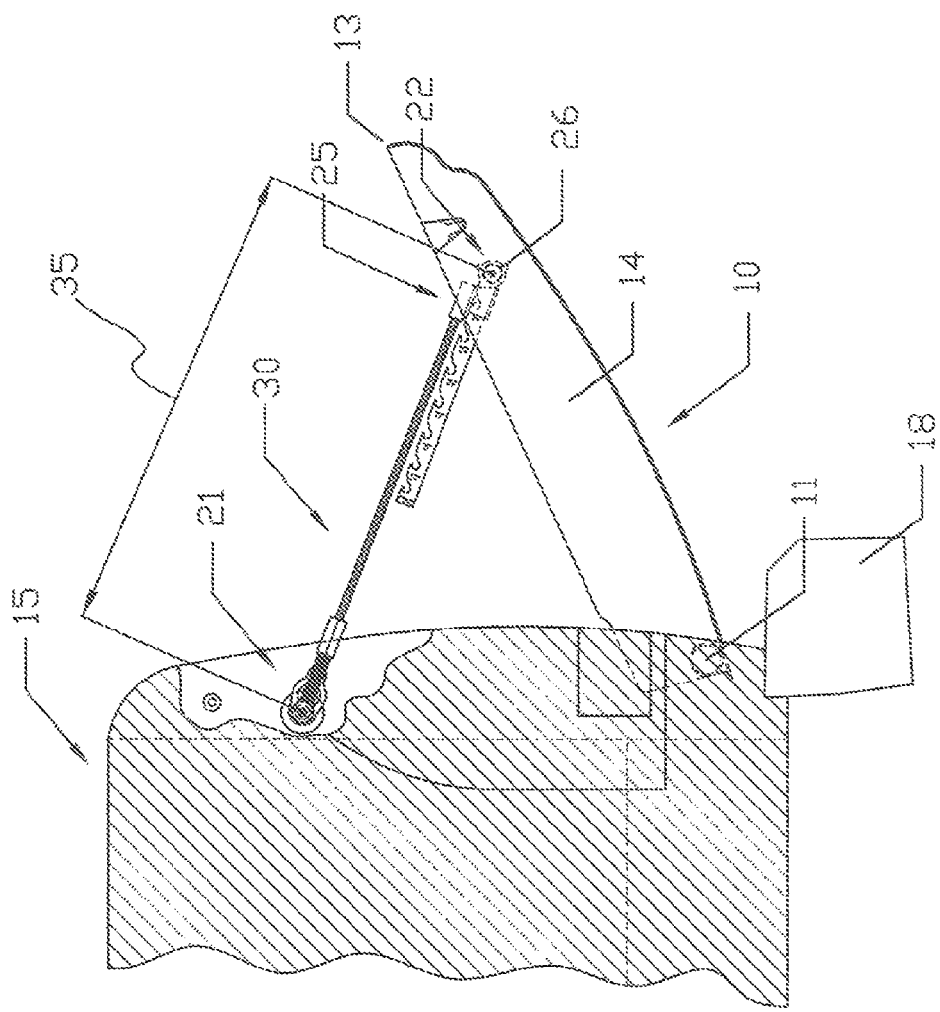
FIG. 11 is a side elevation view of the tailgate support of FIG. 10 suspending a tailgate above the conventional open position.
Figure 15:
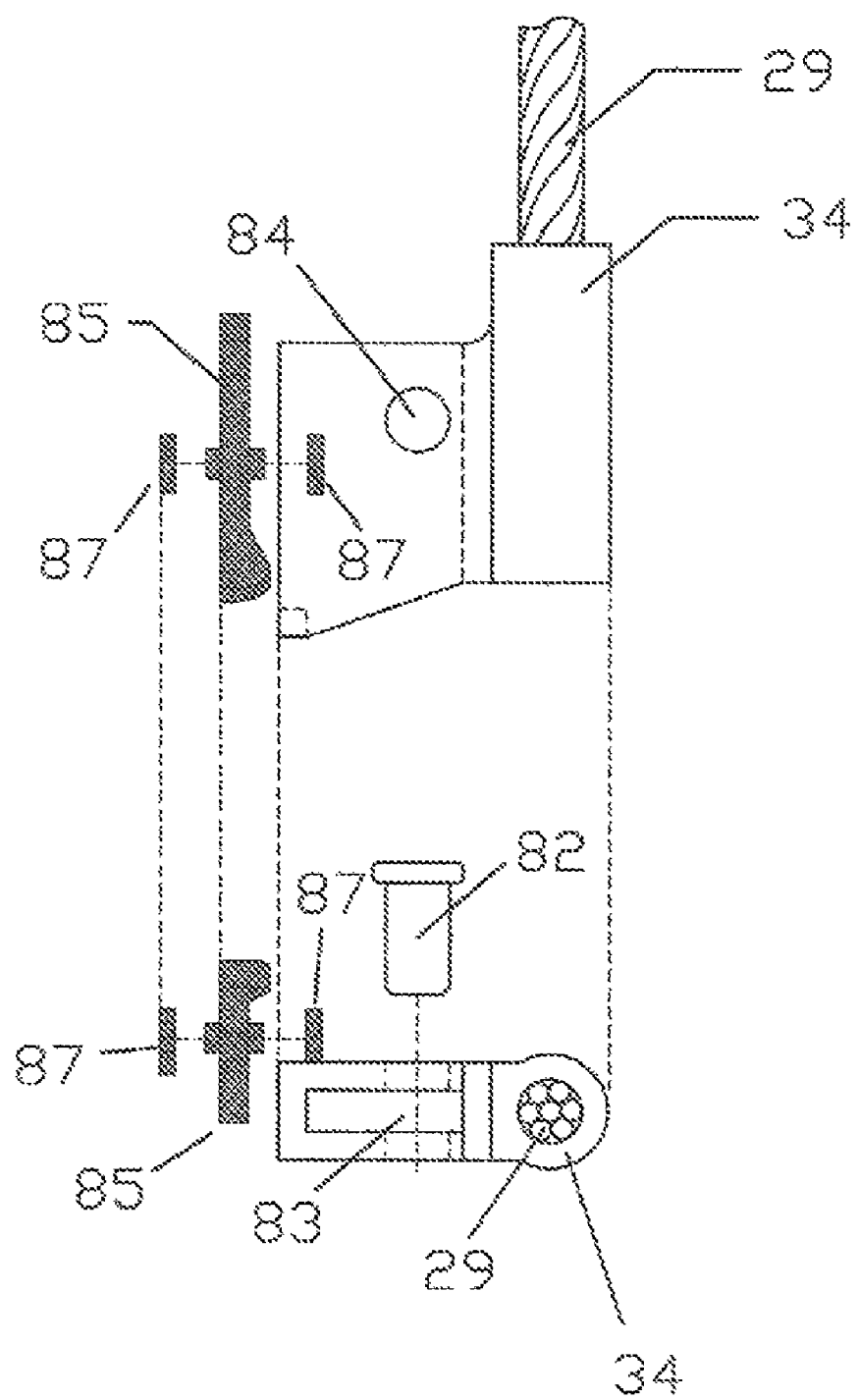
FIG. 15 provides side elevation and end views of the traveler of the tailgate support of FIG. 10 and exploded side elevation and end views of the lock of the tailgate support of FIG. 10.

Referring to FIGS. 7 through 9, in selected embodiments, a first end 21 of a tailgate support 30 in accordance with the present invention may include an aperture 27 and corresponding keeper 23 sized and shaped to engage and retain a stud 24 extending from the side wall 17 of a vehicle. At the other end 22, a tailgate support 30 may have an aperture 28 formed therein for receiving a fastener 26 therethrough. The fastener 26 may then connect the second end 22 of the tailgate support 30 to the tailgate 10.

In selected embodiments, an adjustor 25 and one or more lengths of cable 29 may be positioned between the first and second ends 21, 22 of a tailgate support 30. In certain embodiments, an adjustor 25 may include an extension 32, a traveler 50, and a lock 60. A length of cable 29 may extend to connect a traveler 50 to the first end 21 of the tailgate support 30. In selected embodiments, a component defining the aperture 27 at the first end 21 of a tailgate support 30 may include a receiver 34 receiving and securing (e.g., in a press fit) one end of the length of cable 29. A traveler 50 may include a receiver 34 to receive and secure the other end of the length of cable 29.

A lock 60 may be configured to selectively fix a traveler 50 to an extension 32 at multiple locations along the extension 32. In certain embodiments, an extension 32 may include an array of apertures 42, a traveler 50 may include a locking aperture 54, and a lock 60 may comprise a locking pin 62. When the locking aperture 54 of a traveler 50 is aligned with an aperture 42 of the extension 32, the apertures 42, 54 may collectively form a composite aperture. The locking pin 62 may be inserted within this composite aperture and effectively lock or fix the traveler 50 with respect to the extension 32.

In selected embodiments, a traveler 50 may include an aperture 56 shaped and sized to receive an extension 32 therewithin. In one embodiment, the aperture 56 may permit a traveler 50 to slide along or over an extension 32. Accordingly, a user may slide a traveler 50 along or over an extension 32, aligning the locking aperture 54 of the traveler 50 with any corresponding aperture 42 in the extension 32.

In certain embodiments, an extension 32 may include a stop 44 located proximate a first end thereof. A stop 44 may prevent a traveler 50 from inadvertently sliding off the first end of the extension 32. In selected embodiments, the second end of an extension 32 (i.e., the end opposite a stop 44) may form the second end 22 of a tailgate support 30. To accommodate the aperture 28 extending therethrough, the second end 22 of a tailgate support 30 may be larger in width than the rest of the extension 32. This additional width may prevent a traveler 50 from inadvertently sliding off the second end of the extension 32. Accordingly, a stop 44 and second end 22 may define the range of motion of a traveler 50 along or over an extension 32. When a lock 60 is not engaged, a traveler 50 may be free to move within this range of motion.

To adjust the tensioned length 35 of a tailgate support 30 and thereby control a corresponding suspended position of a tailgate 10, a user may disengage a lock 60 to free a traveler 50 (e.g., pull the locking pin 62 from one composite aperture), move or slide the traveler 50 along or over the extension 32 until the locking aperture 54 of the traveler 50 aligns with a different aperture 42 of the extension 32 (e.g., form a new composite aperture), and then engage the lock 60 to fix the traveler 50 in the new location (e.g., insert the locking pin 62 into the new composite aperture). This process may be repeated for each tailgate support 30 connected to the tailgate 10. In selected embodiments, the apertures 42 in an extension 32 may be numbered to assist a user in adjusting all tailgate supports 30 corresponding to the tailgate 10 to the same tensioned length 35.

Each aperture 42 of an extension 32 may correspond to a different tensioned length 35 and, therefore, a different suspended position of a tailgate 10. In selected embodiments, an intermediate aperture 42 may correspond to a tailgate 10 supported or suspended in a conventional open position, which is about ninety degrees of rotation from the closed position. Apertures 42 on one side of that intermediate aperture 42 may correspond to a tailgate 10 supported or suspended with its leading or top edge 13 lower than it is in the convention open position. Apertures 42 on the other side of that intermediate aperture 42 may correspond to a tailgate 10 supported or suspended with its leading or top edge 13 higher than it is in the convention open position.

The number of apertures 42 on each side of an intermediate aperture 42 need not be balanced. For example, in the illustrated embodiment, the intermediate aperture 42 is labeled "0." Two apertures 42 are positioned on one side of the intermediate aperture 42, while five apertures 42 are positioned on the other side of the intermediate aperture 42. The two apertures 42 may correspond to tailgate positions lower than the convention open position. The five apertures 42 may correspond to tailgate positions higher than the convention open position.

A lock 60 in accordance with the present invention may have any configuration suitable for selectively fixing a traveler 50 with respect to an extension 32. In certain embodiments, a lock 60 may be configured as a locking pin 62 sized to engage composite apertures formed when a locking aperture 54 of a traveler 50 aligns with an aperture 42 of an extension 32. In such embodiments, a locking pin 62 may include a ring 64, a detent 66, and a lanyard 68. A ring 64 may enable a user to grasp a pin 62. A detent 66 may resist inadvertent removal of a pin 62 from a composite aperture. A lanyard 68 may tether a locking pin 62 to the rest of a tailgate support 30 (e.g., to a traveler 50) to prevent its misplacement or loss.

The components of an adjustor 25 in accordance with the present invention may be formed of any suitable material or combination of materials. Suitable materials may be selected based on cost, formability, strength, durability, corrosion resistance, and the like. In selected embodiments, the components of an adjustor 25 may be formed of metal, metal alloys, or combinations thereof.

Referring to FIGS. 10 through 16*f*, in certain alternative embodiments, the apertures 42 of an extension 32 may be configured as notches 42. In such embodiments, a traveler 50 may include an aperture 84 penetrated by a pin 82 and a lock 60 may include a latch 85, a spring 86, and a pivot 87. The spring 86 may bias a latch 85 toward an engaged position. In the engaged position, the latch 85 may resist disengagement between a notch 42 of an extension 32 and the pin 82 of a traveler 50. Conversely, by pivoting a latch 85 against the bias of the spring 86, the latch 85 may move to a disengaged position. In the disengaged position, an extension 32 may be free to rotate with respect to a traveler 50 until the notch 42 of the extension 32 disengages the pin 82 of the traveler 50.

Once rotated out of engagement, the traveler 50 may be moved along the extension to another location (e.g., notch 42). When the traveler 50 reaches the desired location, the extension 32 may rotate with respect to the traveler 50 until a new notch 42 of the extension 32 engages the pin 82 of the traveler 50. The spring 86 may then return the latch 85 toward the engaged position and resist disengagement between the notch 42 and the pin 82. This process may be repeated for each tailgate support 30 connected to the tailgate 10.

Referring to FIGS. 17 and 18, in certain alternative embodiments, a tailgate support 30 may include multiple travelers 50. For example, a first traveler 50*a* may be positioned as described hereinabove. A second traveler 50*b* may be connected to a receiver 34 located proximate a first end 21 of a tailgate support 30. Each traveler 50*a*, 50*b* may have its own range of motion along a common extension 32. However, the multiple distinct tensioned lengths 35 provided by an engagement between the second traveler 50*b* and the extension 32 may be significantly shorter than the multiple distinct tensioned lengths 35 provided by an engagement between the first traveler 50*a* and the extension 32. Accordingly, the second traveler 50*b* may enable a tailgate support 30 to support or suspend a tailgate 10 in higher positions than those provided by the first traveler 50*a*.

To transition a tailgate 10 from the higher positions provided by the second traveler 50*b* to the lower positions provided by the first traveler 50*a*, a user may disengage the lock 60 corresponding to the second traveler 50*b* and remove the second traveler 50b from the extension 32. To transition a tailgate 10 from the lower positions provided by the first traveler 50a to the higher positions provided by the second traveler 50b, a user may insert the extension 32 with the second traveler 50b and engage the lock 60 associated therewith.

Referring to FIG. 19, while the embodiments described hereinabove include tailgate supports 30 comprising apertures 27 and keepers 23, other attachment mechanisms may be used or substituted in the embodiments described. Accordingly, the first end 21 of a tailgate support 30 may be configured to fit existing, common, or conventional tailgate systems. For example, in the illustrated embodiment, the first end 21 of a tailgate support 30 has been configured to fit an alternative embodiment of a stud 24 extending from the vehicle (e.g., from the side wall 17 of a truck bed). Due to the shape of this alternative stud 24, the illustrated first end 21 does not need a keeper 23.

Referring to FIGS. 20 and 21, by allowing a tailgate 10 to open more than ninety degrees, embodiments in accordance with the present invention lower the leading or top edge 13 of the tailgate 10. This may result in a reduction in the incline of loading ramps 93 used when loading items such as motorcycles, ATV's 94, small tractors, or the like into the bed of a vehicle. By reducing the loading ramp angle 92 of the loading ramps 93, it may be easier and safer to load and unload such items.

Referring to FIGS. 22 through 25, a tailgate 10 with a lower leading edge 13 may facilitate loading of items with low ground clearance (e.g., riding lawn mowers 95). Such items would normally hang on the leading edge 13 of a conventional tailgate 10 at the location where the loading ramps 93 rest. However, in embodiments in accordance with the present invention, when the leading edge 13 of the tailgate 10 is lowered below the plane of the bed floor 16, both the incline of the loading ramps 93 and the break-over angle 91 are reduced.

The break-over angle 91 may be defined as the angle between the plane of the tailgate 10 extended rearward and the angle of the loading ramp(s) 93. The angle that a tailgate 10 rotates down from the conventional open position to a fully open position in accordance with the present invention may be referred to as the tailgate decline angle 90. Accordingly, between the tailgate decline angle 90 and the reduced break-over angle 91, embodiments in accordance with the present invention may provide a more gradual transition from ground to bed floor 16.

Figure 26:
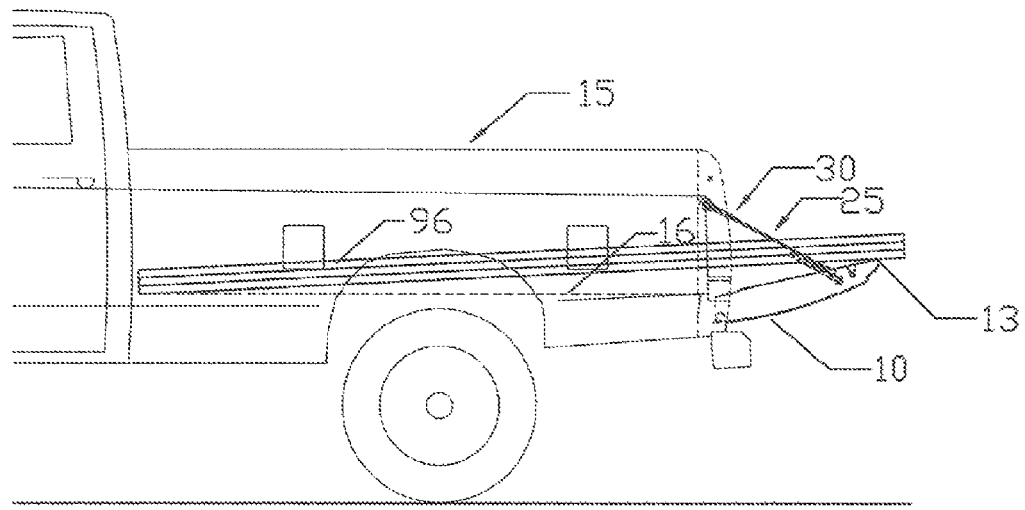
FIG. 26 is a schematic diagram illustrating a tailgate suspended, by a tailgate support in accordance with the present invention, above a conventional open position to better retain cargo extending longer than the bed of the pickup truck.
Figure 27:
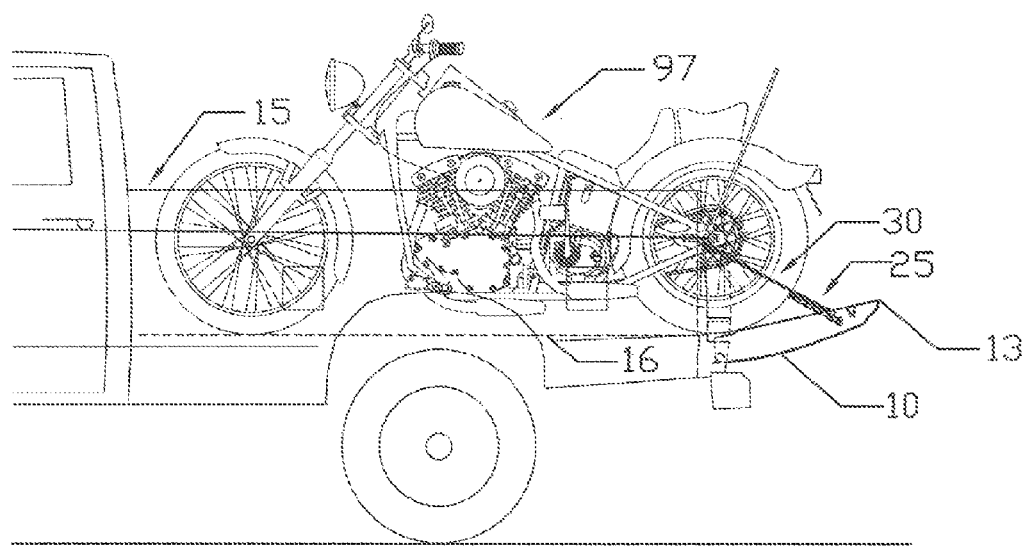
FIG. 27 is a schematic diagram illustrating a tailgate suspended, by a tailgate support in accordance with the present invention, above a conventional open position to better retain cargo extending longer than the bed of the pickup truck.
Figure 28:
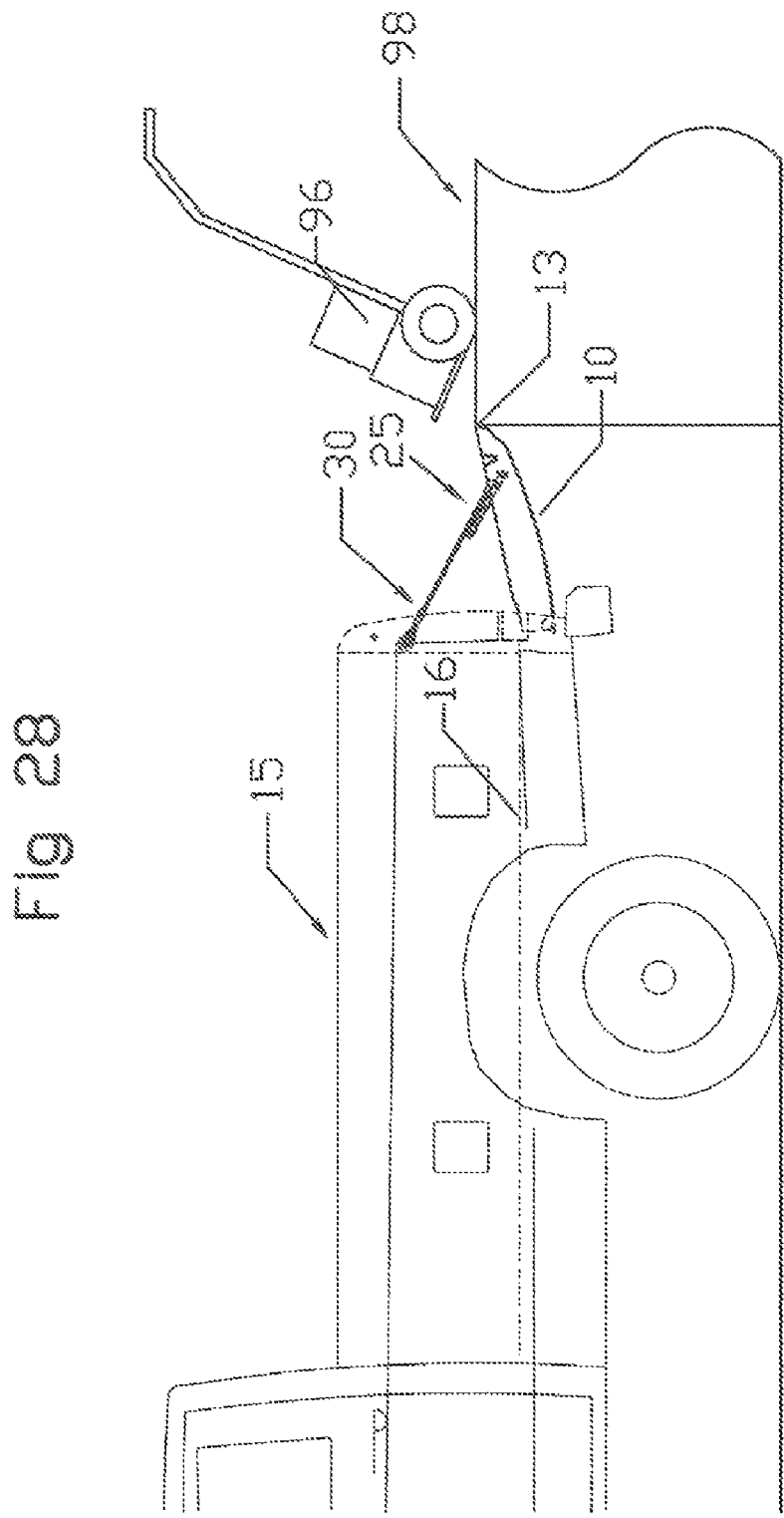
FIG. 28 is a schematic diagram illustrating a tailgate suspended, by a tailgate support in accordance with the present invention, above a conventional open position to facilitate loading the bed of a pickup truck from surfaces higher than the bed.

Referring to FIGS. 26 through 28, additionally, embodiments in accordance with the present invention allow the height of the leading edge 13 of the tailgate 10 to be easily adjusted to facilitate moving cargo between the pickup bed floor 16 and loading docks 98 of various heights. They may also facilitate securement of cargo 96 (e.g., motorcycles 97 or lumber) that is longer than the vehicle bed 15.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for positioning a tailgate of a vehicle, the method comprising:
   selecting a vehicle comprising
   a first side, second side, tailgate, and first tailgate support,
   the tailgate connected to pivot with respect to the first and second sides through a range of motion,
   the first tailgate support comprising a first end connected to the first side, a second end connected to the tailgate, an adjustor located between the first and second ends, and a flexible member extending between the adjustor and one of the first and second ends,
   the first tailgate support, wherein the adjustor comprises a traveler and an extension, the extension being substantially rigid, the traveler connected to the flexible member and configured to selectively travel with respect to the extension, and
   the first tailgate support having a tensioned length achieved by pulling the first and second ends away from one another;
   unlocking the the traveler with respect to the extension;
   moving, after the unlocking, the traveler with respect to the extension to transition the tensioned length from a first value to a second value, distinct from the first value; and
   locking, after the manipulating, the traveler with respect to the extension to maintain the tensioned length at the second value.

2. The method of claim 1, wherein the selecting comprises selecting the vehicle having the adjustor comprising a lock configured to selectively lock the traveler to the extension at multiple locations along the extension.

3. The method of claim 2, wherein the unlocking comprises releasing the lock to free the traveler with respect to the extension.

4. The method of claim 3, wherein the moving comprises translating the traveler along the extension.

5. The method of claim 4, wherein the locking comprises engaging the lock to fix the traveler with respect to the extension.

6. The method of claim 5, wherein the selecting comprises selecting the vehicle having the extension comprising an array of apertures.

7. The method of claim 6, wherein the selecting comprises selecting the vehicle having the traveler comprising a locking aperture.

8. The method of claim 7, wherein the selecting comprises selecting the vehicle having the lock comprising a shear pin.

9. The method of claim 8, wherein:
   the moving further comprises aligning the locking aperture with a selected aperture of the array of apertures to form a composite aperture; and
   the locking further comprises inserting the shear pin within the composite aperture.

10. The method of claim 1, wherein the selecting comprises selecting the vehicle having the tailgate with the range of motion comprising a first, closed position, a second, open position, and a third, open position, the second position being located about ninety degrees of rotation from the first position.

11. The method of claim 10, further comprising suspending, by the first tailgate support having the tensioned length equal to the second value, the tailgate in the second position.

12. The method of claim 10, further comprising suspending, by the first tailgate support having the tensioned length equal to the second value, the tailgate in the third position.

13. The method of claim 12, wherein the selecting comprises selecting the vehicle having the tailgate with the third position being located more than ninety degrees of rotation from the first position.

14. The method of claim 1, wherein the selecting comprises selecting the vehicle further comprising a second tailgate support having a first end connected to the second side, a second end connected to tailgate, and an adjustor located between the first and second ends thereof.

15. The method of claim 14, wherein the selecting comprises selecting the vehicle with the second tailgate support having a tensioned length achieved by pulling the first and second ends thereof away from one another.

16. The method of claim 15, further comprises manipulating the adjustor of the second tailgate support to transition the tensioned length thereof from the first value to the second value.

17. The method of claim 16, further comprising:
unlocking the adjustor of the second tailgate support; and
locking, after the manipulating, the adjustor of the second tailgate support to maintain the tensioned length thereof at the second value.

18. A method for positioning a tailgate of a vehicle, the method comprising:
selecting a vehicle comprising
a first side, second side, tailgate, and first tailgate support,
the tailgate connected to pivot with respect to the first and second sides through a range of motion, and
the first tailgate support comprising a first end connected to the first side and a second end connected to the tailgate;
disconnecting the first tailgate support from the rest of the vehicle;
procuring a second tailgate support comprising a first end, a second end, an adjustor located between the first and second ends thereof, and a flexible member extending between the adjustor and one of the first and second ends, the second tailgate support having a tensioned length achieved by pulling the first and second ends thereof away from one another, the adjustor comprising a traveler and an extension, the extension being substantially rigid, the traveler connected to the flexible member and configured to selectively travel with respect to the extension;
installing, after the disconnecting, the second tailgate support by connecting the first end thereof to the first side and connecting the second end thereof to the tailgate;
unlocking, after the installing, the the traveler with respect to the extension;
moving, after the unlocking, the the traveler with respect to the extension to transition the tensioned length from a first value to a second value, distinct from the first value; and
locking, after the manipulating, the the traveler with respect to the extension to maintain the tensioned length at the second value.

19. A vehicle comprising:
a first side;
a second side;
a tailgate connected to pivot with respect to the first and second sides through a range of motion;
a tailgate support having a first end and a second end, the first end connected to the first side, the second end connected to tailgate;
the tailgate support further having a tensioned length achieved by pulling the first and second ends away from one another; and
the tailgate support comprising an adjustor positioned between the first and second ends and a flexible member extending between the adjustor and one of the first and second ends, the adjustor selectively transitioning the tensioned length between a first value and a second value, greater than the first value, the adjustor comprising
a rigid extension,
a traveler connected to the flexible member and configured to selectively travel with respect to the extension, and
a lock configured to selectively fix the traveler to the extension at multiple locations along the extension.

20. The vehicle of claim 19, wherein:
the extension comprises an array of apertures,
the traveler comprises a locking aperture, and
the lock comprises a shear pin selectively locking in alignment the locking aperture and an aperture of the array of apertures.

* * * * *